(12) United States Patent
Yanagisawa

(10) Patent No.: US 6,961,298 B2
(45) Date of Patent: Nov. 1, 2005

(54) OPTICAL HEAD DEVICE HAVING A PLURALITY OF OPTICAL ELEMENTS WITH VARIOUS TRANSMISSION EFFICIENCIES

(75) Inventor: Katsushige Yanagisawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 499 days.

(21) Appl. No.: 10/061,244

(22) Filed: Feb. 4, 2002

(65) Prior Publication Data

US 2002/0105893 A1 Aug. 8, 2002

(30) Foreign Application Priority Data

Feb. 2, 2001 (JP) ..................................... P.2001-026339

(51) Int. Cl.[7] ................................................ G11B 7/00
(52) U.S. Cl. ............................ 369/112.17; 369/112.21; 369/112.28; 369/112.29
(58) Field of Search ...................... 369/112.17, 112.21, 369/112.28, 112.29

(56) References Cited

U.S. PATENT DOCUMENTS

| | | | |
|---|---|---|---|
| 6,238,063 B1 * | 5/2001 | Tanitsu et al. | 362/268 |
| 6,272,098 B1 * | 8/2001 | Takahashi et al. | 369/112.17 |
| 6,426,837 B1 * | 7/2002 | Clark et al. | 359/485 |
| 6,462,873 B1 * | 10/2002 | Kwok et al. | 359/487 |
| 6,563,977 B1 * | 5/2003 | Chen et al. | 385/24 |
| 6,597,430 B1 * | 7/2003 | Nishi et al. | 355/53 |
| 6,717,906 B1 * | 4/2004 | Shimano | 369/112.26 |

* cited by examiner

*Primary Examiner*—Gautam R. Patel
(74) *Attorney, Agent, or Firm*—Sughrue Mion, PLLC (57) ABSTRACT

In an optical head device for recording/reproducing information on/from an optical recording medium, at least one laser light source emits a laser light beam provided with a first polarized light component and a second polarized light component which are perpendicular to each other. A plurality of optical elements transmit a return light beam reflected by the optical recording medium passes to the light receiving element. A transmission efficiency for the first polarized light component and a transmission efficiency for the second polarized light component in each optical element is made different. A total transmission efficiency for the first polarized light component and a total transmission efficiency for the second polarized light component, which are defined by the respective transmission efficiencies of all the optical elements, are made substantially identical.

12 Claims, 7 Drawing Sheets

OPTICAL HEAD DEVICE HAVING A PLURALITY OF OPTICAL ELEMENTS WITH VARIOUS TRANSMISSION EFFICIENCIES

BACKGROUND OF THE INVENTION

The present invention relates to an optical head device of the type in which a laser light is emitted from a laser light source and reflected on an optical recording medium, and a resultant return light passes through or is reflected by a plurality of optical elements, and is led to a light receiving element.

CD, CD-R, DVD and the like which are different in substrate thickness and recording mode, e.g., recording density, are own for the optical recording medium. To reproduce information from a DVD containing information recorded thereon in high density, it is necessary to use a short-wave laser light having a wavelength of 650 nm or 635 nm. It is a common practice that a laser light having a long wavelength of 760 to 780 nm is used for the CD reproduction. However, the short-wave laser light for the DVD reproduction may be used for the CD reproduction, as a matter of course. The CD-R (recordable) or the CD-RW (rewritable), which is developed on the basis of the CD, is designed so as to produce the maximum performances by using the long wave laser light, which is generally used for CD reproduction. Therefore, to handle both the CD-R and DVD by a single optical head device, it is necessary to install two laser light sources to the device, a first laser light source for emitting a short wave laser light, and a second laser light source for emitting a long wave laser light.

If two separate optical systems are used for the optical head device, the number of optical elements is increased when comparing with the optical head device using a single optical system. Further, the device size is increased, and the device cost is also increased.

Figure 5:
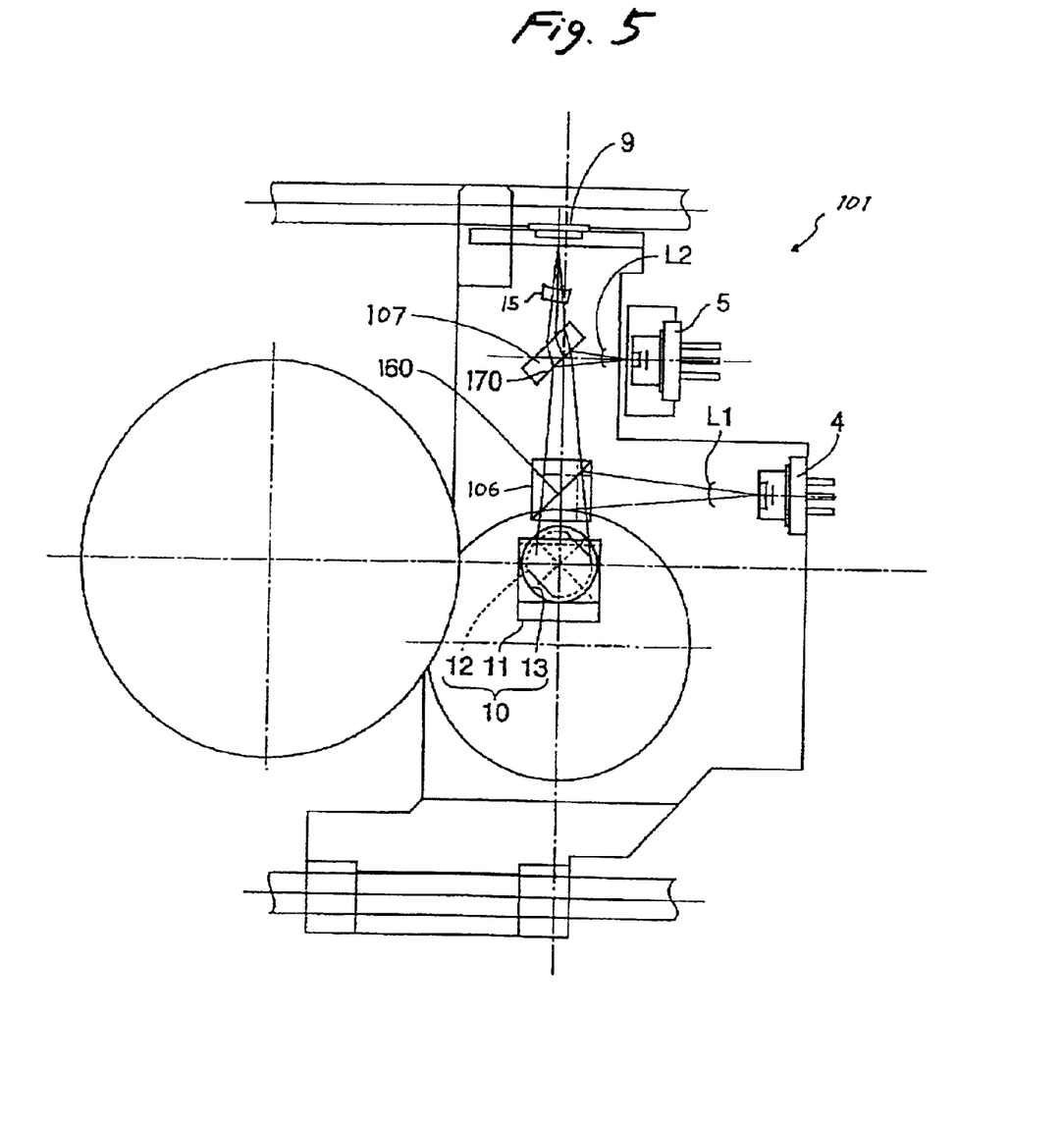
FIG. 5 is a plan view showing an essential portion of a related optical head device.

To cope with this, a related optical head device, as shown in FIG. 5, uses a first light source (first laser light source) 4 for emitting a first laser light (short wave laser light) L1 having a wavelength of 650 nm and a second light source (second laser light source) 5 for emitting a second laser light (long wave laser light) L2 having a wavelength of 785 nm. The first laser light L1 emitted from the first light source 4 and the second laser light L2 emitted from the second light source 5 are guided, by a prism 106 serving as an optical path composition element, to a common optical path 10 destined for the optical recording medium. In the optical system, a mirror 11, a collimate lens 12 and an objective lens 13 are disposed in this order on and along the common optical path 10.

In the optical head device 101, to guide the first laser light L1 emitted from the first light source 4 and the second laser light L2 emitted from the second light source 5 to the common optical path 10, a half mirror 107 serving as a return light splitter is disposed on the optical path ranging from the second light source 5 to the optical recording medium. The half mirror 107 partially reflects the second laser light L2 emitted from the second light source 5 toward the prism 106, and allows a return light from the optical recording medium to partially pass therethrough so that the return light is directed to the light receiving element 9. The first laser light L1 emitted from the first light source 4 is directly incident on the prism 106.

Figure 6A:
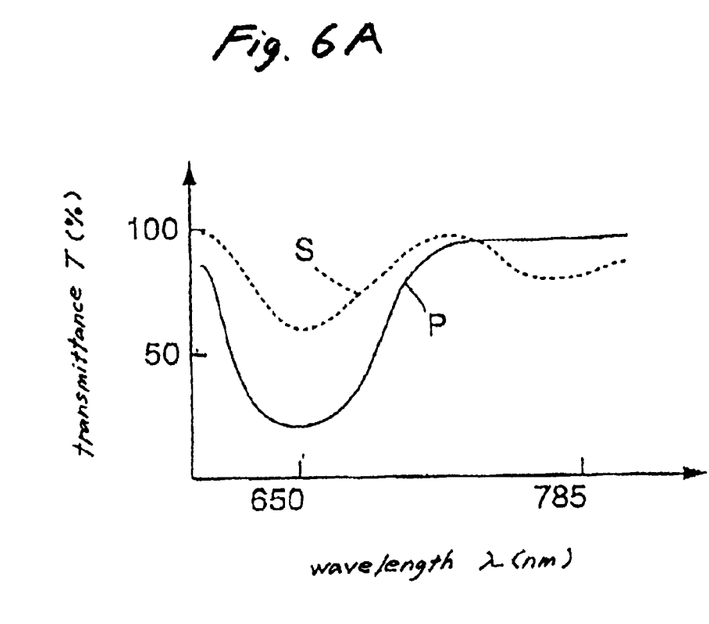
FIGS. 6A and 6B are graphs showing transmittances of partial reflection faces of a prism and a half-mirror used in the related optical head device, respectively.
Figure 6B:
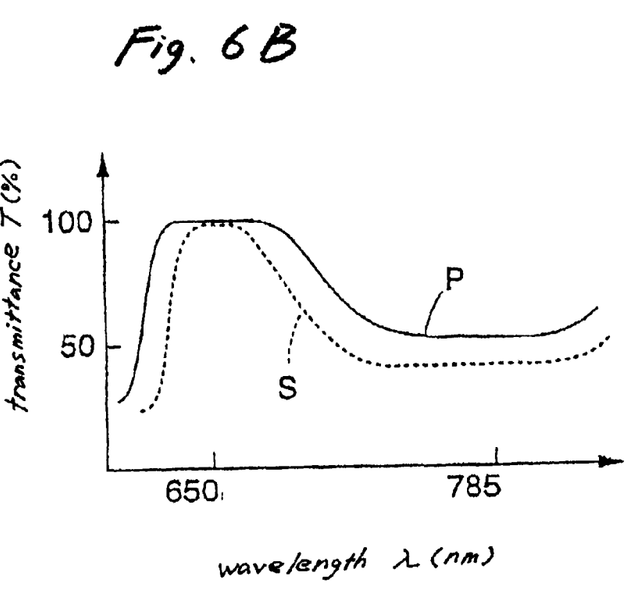

In the optical head device 101 thus constructed, for the DVD first laser light L1, of the first and second polarized light components of which polarization directions are perpendicular to each other, the first polarized light component is used. For the CD second laser light L2, the second polarized light component is used. Assuming that the first and second polarized light components are respectively the S- and P-polarized light components in the prism 106 and the half mirror 107, the partial reflection faces 160 and 170 of the prism 106 and the half mirror 107 exhibit optical transmittance indicated by solid lines P and dashed lines S in FIGS. 6A and 6B, for the S-polarized light component and the P-polarized light component.

Accordingly, the first laser light L1 emitted from the first light source 4 is first incident on the prism 106; a light component which is substantially the half of the laser light is reflected by the partial reflection face 160 of the prism 106; the optical axis of the laser light is curved by 90 degrees and the laser light is directed to the mirror 11; and the laser light is reflected upward and incident on the collimate lens 12. The first laser light L1 thus guided to the collimate lens 12 is converted into a collimated light beam, guided to the objective lens 13, and converged into a light spot on the recording face of the DVD as an optical recording medium, by the objective lens 13.

The first laser light L1 as reflected by the optical recording medium travels back through the objective lens 13, the collimate lens 12 and the mirror 11, and reaches the prism 106. A light component of approximately 50% passes through the partial reflection face 160 of the prism 106 and advances to the half mirror 107. Most of the return light of the first laser light L1 passes through the partial reflection face 170 of the half mirror 107; it is incident on the sensor lens 15; it passes through the sensor lens 15; and it reaches the light receiving element 9. Accordingly, a light component of approximately 50% of the first laser light L1 emitted from the first light source 4 is guided to the optical recording medium, and the light component of approximately 50% of the return light of the first laser light L1, which is returned by the optical recording medium, reaches the light receiving element 9.

The second laser light L2 as emitted from the second light source 5 is incident on the partial reflection face 170 of the half mirror 107, and a light component of approximately 50% of the incident laser light is reflected by the partial reflection face 170. The optical axis of the reflecting light is curved by approximately 90 degrees and the light is incident on the prism 106. Most of the second laser light L2 that is incident on the prism 106 passes through the partial reflection face 160 of the prism 106, and is directed to the mirror 11 on the common optical path 10. Then, the light is reflected upward by the mirror 11 and goes to the collimate lens 12. The second laser light L2 that is thus guided to the collimate lens 12 is converted into a collimated light beam, and then guided to the objective lens 13. The laser light is converged into a light spot on the recording face of the CD as the optical recording medium, by the objective lens 13.

The second laser light L2 that reflected by the optical recording medium travels back to the prism 106, through the objective lens 13, collimate lens 12 and mirror 11. Most of the second laser light passes through the partial reflection face 160 of the prism 106, and goes to the half mirror 107. AS light component of approximately 50% of the return light of the CD laser light L2 passes through the partial reflection face 170 of the half mirror 107; it is incident on the sensor lens 15; and it passes through the sensor lens 15 and reaches the light receiving element 9. Accordingly, a light component of approximately 50% of the second laser light L2 that is emitted from the second light source 5 is guided to the optical recording medium, and the light component of abut 50% of the second laser light L2 reflected by the optical recording medium reaches the light receiving element 9.

The construction of the optical head device described above is valid on the assumption that the optical recording medium does not have birefringence, and when the first laser light L1 and the second laser light L2 are reflected by the optical recording medium, the polarization planes of them are not varied. Many optical recording mediums, commercially available, have birefringence in the radial direction since in the process of resin molding the optical recording medium, the formation of the optical recording medium is affected by the resin flow direction. For this reason, when information is reproduced from the commercially available, optical recording medium by use of the related optical head device, satisfactory reproducing characteristics of the optical head device can not be always obtained.

In the light that is incident on and reflected from a disc having birefringence, a phase difference is caused between a polarized light having an ordinary ray direction by the birefringence and a polarized light having an extraordinary ray direction. When the polarization direction of the first polarized light and the direction of the second polarized light are not perpendicular to the ordinary ray direction and the extraordinary direction, a light-amount ratio of the first polarized light and the second polarized light before those are incident on the disc is different from that after those are incident on the disc. Accordingly, in the worst case, there is a case that when only the first polarized light is incident on the disc, the reflecting light is entirely changed into the second polarized light.

In the optical head device thus constructed, when the first laser light L1 is reflected by the optical recording medium D, and the S-polarized light component is changed into the P-polarized light component through the action of the birefringence of the disc, a transmittance of the laser light on the partial reflection face 170 of the half mirror 107 is 100% and remains little changed. However, the transmittance of the laser light on the partial reflection face 160 of the prism 106 is reduced to approximately 20% of the original one. Therefore, of the return light of the first laser light L1 that is reflected by the optical recording medium, only the light component of approximately 20% of the return light reaches the light receiving element 9.

When the second laser light L2 is reflected by the optical recording medium, and its P-polarized light component is changed to an S-polarized light component, the transmittance of the second laser light on the partial reflection face 160 of the prism 106 is reduced to approximately 80% of the original one, and the transmittance of the laser light on the partial reflection face 170 of the half mirror 107 is reduced to approximately 30%. As a result, the light component of only approximately 24% of the return light reflected by the optical recording medium reaches the light receiving element 9.

Figure 7A:
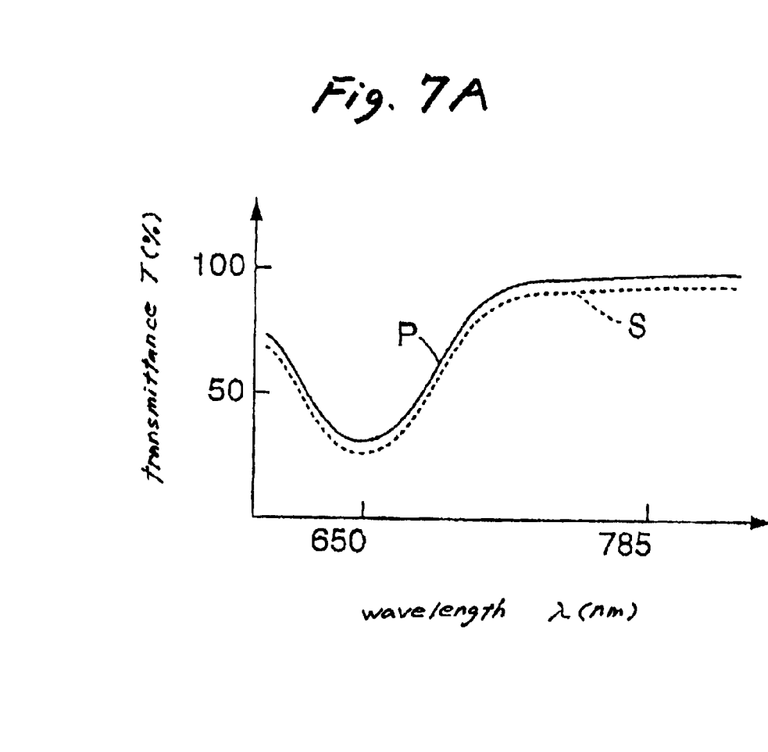
FIGS. 7A and 7B are graphs showing transmittances of partial reflection faces of a prism and a half-mirror of the non-polarization type, respectively.
Figure 7B:
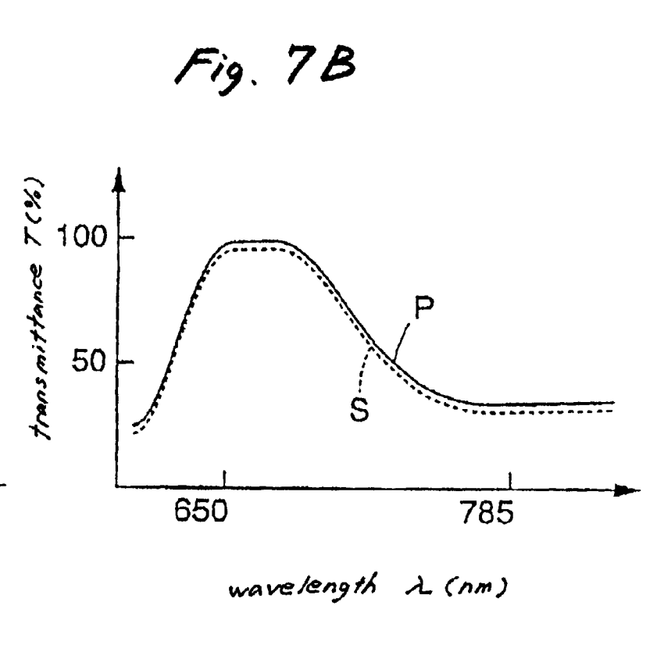

In order that when the first laser light L1 and the second laser light L2 are reflected on the optical recording medium, good reproduction characteristics are secured even if the polarization plane of each laser light is changed because of birefringence of the optical recording medium, a measure may be taken in which the partial reflection faces of the prism and the half mirror are of the non-polarization type. The transmittance exhibited by such partial reflection faces of the prism and the half mirror are shown in FIGS. 7A and 7B, respectively. The partial reflection faces of the prism and the half mirror are formed by layering a multiple of dielectric films. To form the partial reflection faces of the non-polarization type, at least 30 number of dielectric layers must be layered. The prism and the half mirror having the partial reflection faces so structured are expensive. Those layers have manufacturing variances, and hence the transmittance and reflectivity characteristic variances of those optical elements are large with increase of the number of layers.

SUMMARY OF THE INVENTION

It is therefore an object of the present invention is to provide an optical head device which is able to stably reproduce information from an optical recording medium without being affected by birefringence inherent in the optical recording medium.

In order to achieve the above object, according to the present invention, there is provided an optical head device for recording/reproducing information on/from an optical recording medium, comprising:

at least one laser light source, which emits a laser light beam provided with a first polarized light and a second polarized light which are perpendicular to each other;

a light receiving element;

a plurality of optical elements, which transmit a return light beam reflected by the optical recording medium passes to the light receiving element, wherein:

a transmission efficiency for the first polarized light component and a transmission efficiency for the second polarized light component in each optical element is made different; and a total transmission efficiency for the first polarized light component and a total transmission efficiency for the second polarized light component, which are defined by the respective transmission efficiencies of all the optical elements, are made substantially identical.

In this configuration, even if the transmission efficiencies (transmittance or reflectivity) of the plurality of optical elements through which the return light beam from the optical recording medium passes before reaching the light receiving element are different from one another, the total transmission efficiency of those optical elements for the first polarized light is substantially equal to that for the second polarized light. Even if a light-amount ratio of the first polarized light and the second polarized light changes when the first and second polarized light components are reflected by the optical recording medium because of birefringence of the optical recording medium, the amount of light reaching the light receiving element (the sum of the light amounts of the first polarized light component and the second polarized light component) is almost fixed. Therefore, also when an optical recording medium having birefringence is loaded to the optical head device, good reproduction characteristics can be attained.

Further, there is no need of determining a layout of the optical system in connection with birefringence of the optical recording medium. A design freedom in designing the optical head device is enhanced.

In the case where the plural optical elements through which the return light reflected from the optical recording medium travels and reaches the light receiving element are all designed to be of the non-polarization type, the optical elements are very expensive. However, in the above configuration, since the optical elements used may have different transmission efficiencies for the first and second polarized light components, cheap optical elements may be used.

Preferably, the at least one laser light source includes a first laser light source for emitting a first laser light beam having a first wavelength and a second laser light source for emitting a second laser light beam having a second wavelength which is different from the first wavelength.

In this configuration, even when an optical recording medium having birefringence is load on an optical head device of the type in which information is recorded on and reproduced from optical recording mediums having different recording modes by correspondingly using two different laser light sources for emitting laser light beams having different wavelengths, good reproducing characteristics can be attained.

Preferably, the first polarized light component is an S-polarized light component of the emitted laser beam, and the second polarized light component is a P-polarized light component of the emitted laser beam.

Preferably, the optical elements include a prism and a half mirror, each having a partial reflection face.

Here, it is preferable that the first laser light beam is used for recording/reproducing information on/from a digital video disk, and the second light beam is used for recording/reproducing information on/from a compact disk.

Further, it is preferable that the first laser light beam reaches the digital video disk while being transmitted by the prism and the half mirror, and the second laser light beam reaches the compact disk while being transmitted by the prism.

Still further, it is preferable that a relay lens having a positive power is disposed between the second laser light source and the prism. Here, a grating element disposed between the second laser light source and the relay lens.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

An optical head device according to one embodiment of the present invention will be described with reference to FIGS. 1 to 4B. The optical head device is used for recording information to and reproducing the same from CD, CD-R, and DVD.

Figure 1:
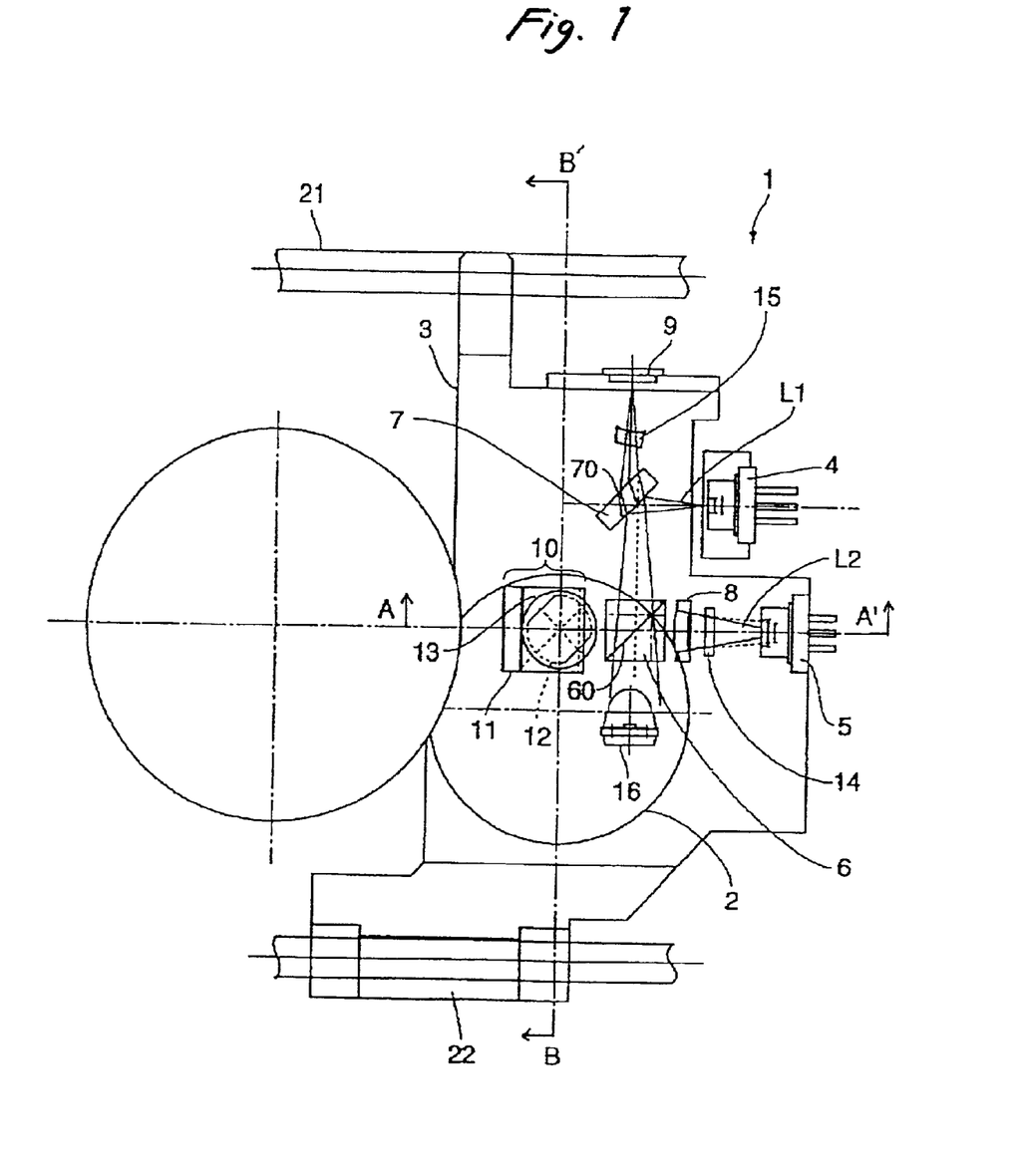
FIG. 1 is a plan view showing an essential portion of an optical head device according to one embodiment of the present invention.

In this embodiment, an optical head device 1 includes a base 3. This base 3 is slidable along two parallel guide shafts 21 and 22, which are mounted on a device frame (not shown). An optical system to be described hereunder is arranged on the base 3.

In the optical head device 1, the optical system includes a laser diode (a first laser light source) 4 for emitting a first laser light (short wave laser light) L1 for DVDs and a laser diode (a second laser light source) 5 for emitting a second laser light (long wave laser light) L2 for CDs. The first light source 4 is used for recording and reproducing information from a DVD, and emits the first laser light L1 having a wavelength of 650 nm. The second light source 5 is used for recording and reproducing information from a CD and CD-R, and emits the first laser light having a wavelength of 785 nm.

Figure 2:
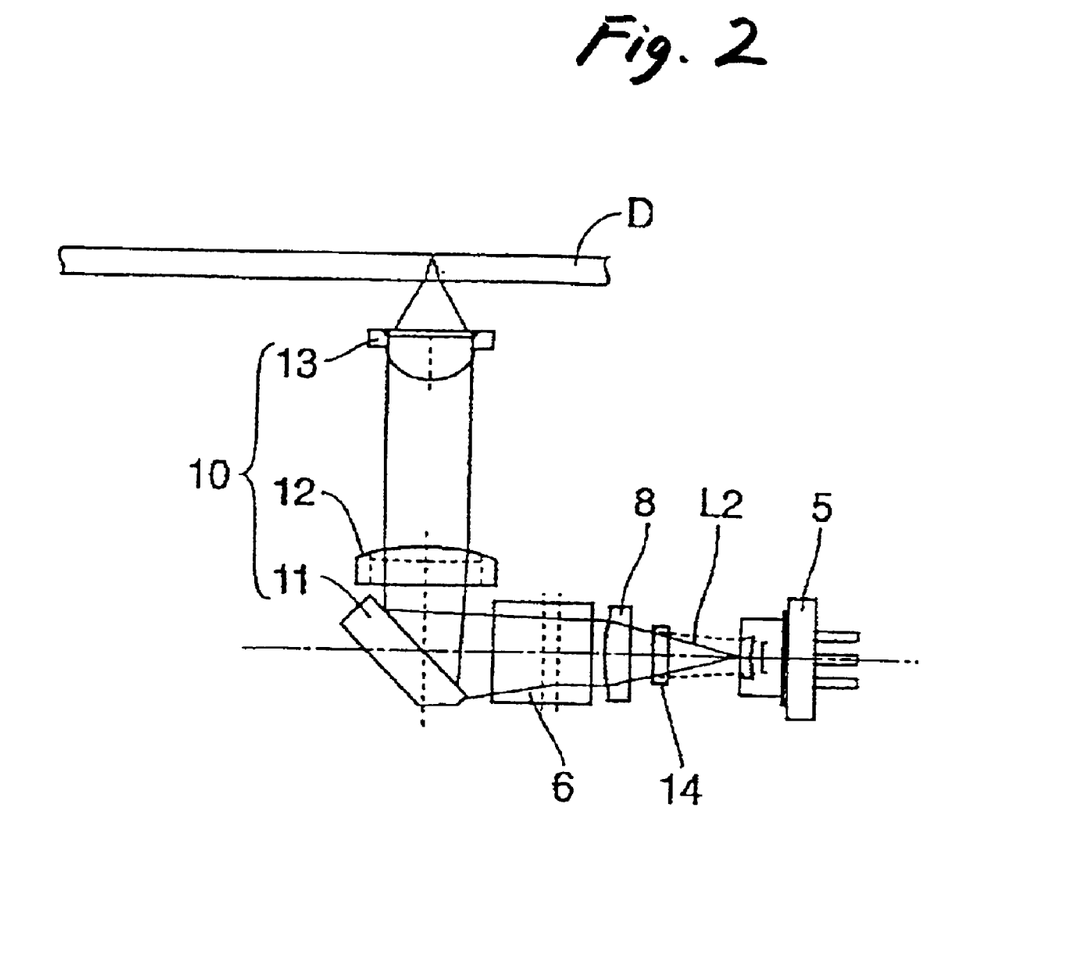
FIG. 2 is a schematic cross sectional view of the optical head device taken on line A–A' in FIG. 1.
Figure 3:
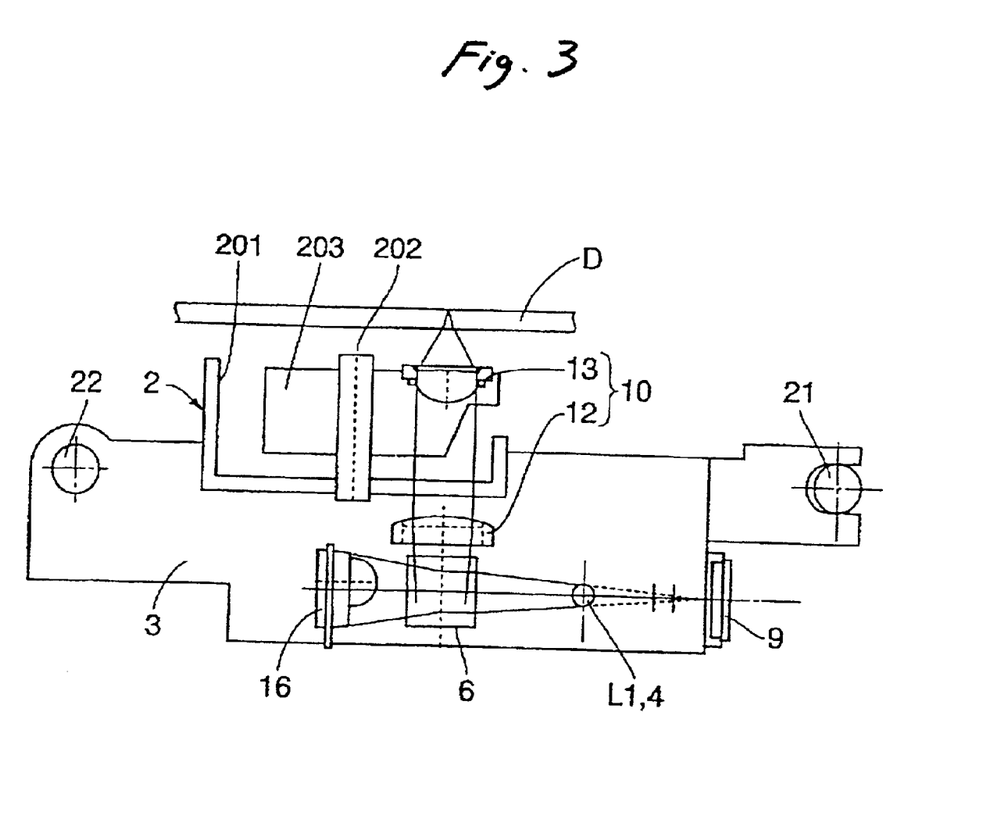
FIG. 3 is a schematic cross sectional view of the optical head device taken on line B–B' in FIG. 1.

As shown in FIG. 2, the first laser light L1 emitted from the first light source 4 and the second laser light L2 emitted from the second light source 5 are guided, by a prism 6 serving as an optical path composition element, to a common optical path 10 destined for an optical recording medium D. A mirror 11, a collimate lens 12 and an objective lens 13 are disposed in this order on the common optical path 10. As shown in FIG. 3, of those optical elements, the objective lens 13 is mounted on a lens holder 203 of a lens driver 2. The lens holder 203 is slidably and rotatably supported on a supporting shaft 202 of a holder support 201.

In the optical head device 1, to guide the first laser light L1 emitted from the first light source 4 and the second laser light L2 emitted from the second light source 5 to the common optical path 10, a half mirror 7 serving as a return light splitter is disposed on the optical path ranging from the second light source 5 to the optical recording medium. The half mirror 7 partially reflects the second laser light L2 emitted from the second light source 5 toward the prism 6, and allows a return light from the optical recording medium to partially pass therethrough so that the return light is directed to the light receiving element 9. A grating lens 14 is disposed on an optical path ranging from the second light source 5 to the prism 6. A light receiving element 16 used for the monitoring purpose is disposed at the side of the prism 6, which is opposed to the half mirror 7 side.

The half mirror 7 is disposed such that a partial reflection face 70 thereof is inclined relative to the optical axis of the first laser light L1 emitted from the first light source 4 at an angle of 45 degrees. The prism 6 is disposed such that a partial reflection face 60 thereof is inclined relative to the optical axes of the laser light L1 and L2 emitted from the laser diodes 4 and 5 at an angle of 45 degrees.

The grating element 14 is provided with predetermined diffraction characteristics, and splits the second laser light L2 emitted from the second light source 5 into three beams. Specifically, the second laser light L2 used for recording and reproducing information from a CD and CD-R is split into three beams by the grating element 14, whereby a known three-beam method is performed to detect tracking errors.

In recording information on a CD-R, it is necessary to form a spot having a large power, and hence a magnification of the optical system must be selected to be small. As the magnification of the optical system decreases, its transmission efficiency of light increases. Accordingly, the optical head device has an advantage that a large amount of emitted light is utilized with a light emission of a small amount of light. In reproducing information from a DVD, it is necessary to form a spot having a small diameter on the optical recording medium D. To this end, it is necessary to increase the magnification of the optical system, and to thereby secure good image formation performance of the optical system.

A relay lens 8 having a positive power is disposed between the grating lens 14 and the prism 6 on the optical path ranging from the second light source 5 to the prism 6. With provision of the relay lens 8, the magnification of the optical system, which is for converging the second laser light L2 emitted from the second light source 5 into a spot on the optical recording medium D, is selected to be small, i.e., within a range of 3.5 to 4.5 times. On the other hand, the magnification of the optical system, which is for converging the first laser light L1 emitted from the first light source 5 into a spot on the optical recording medium D, is selected to be large, i.e., within a range of 6.5 to 7.5 times.

Figure 4A:
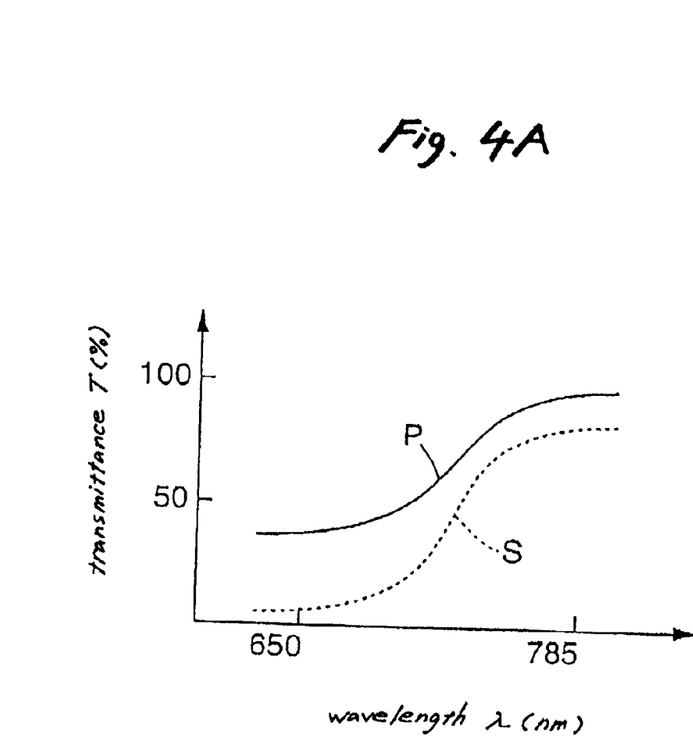
FIGS. 4A and 4B are graphs showing transmittances of partial reflection faces of a prism and a half-mirror used in the optical head device, respectively.
Figure 4B:
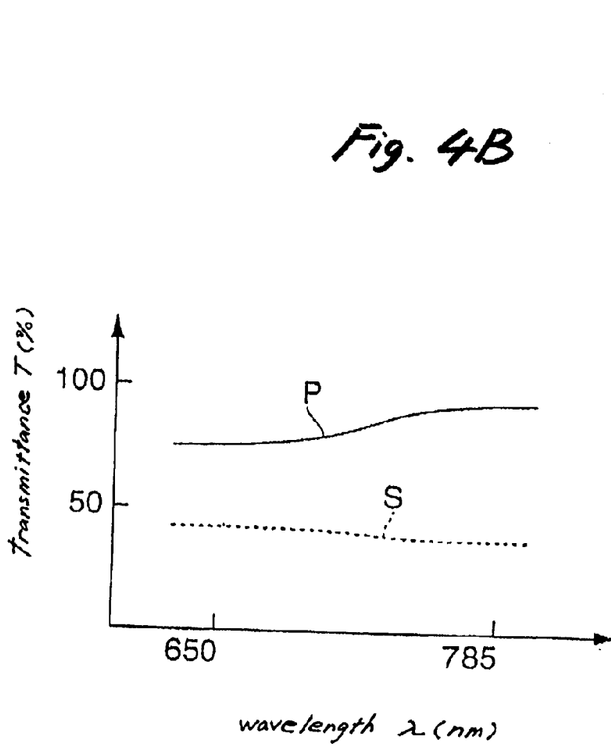

Films of the partial reflection faces 60 and 70 of the prism 6 and the half mirror 7 are designed such that the first polarized light component is used for the first laser light L1 for DVDs, and the second polarized light component is used for the second laser light L2 for CDs. Assuming that the first and second polarized light components are respectively the S- and P-polarized light components in the prism 6 and the half mirror 7, the partial reflection faces 60 and 70 of the prism 6 and the half mirror 7 exhibit transmittances as shown in FIGS. 4A and 4B, respectively. In these figures, transmittances of the optical recording medium for the P- and S-polarized light components are indicated by solid lines P and dashed lines S, respectively.

In the embodiment, as it will be described below, the first laser light L1 for DVDs and the second laser light L2 for CDs are reflected by the optical recording medium D, and guided to the light receiving element 9 after passing through the prism 6 and the half mirror 7. A total transmission efficiency of the prism 6 and the half mirror 7 for those return lights is selected to be substantially equal for both a first polarized light (S-polarized light) and a second polarized light (P-polarized light).

The first laser light L1 as emitted from the first light source 4 is incident on the half mirror 7, and a light component of approximately 61% (R2S: reflectivity of the half mirror 7 for the S-polarized light having a wavelength of 650 nm) of the incident laser light is reflected by the partial reflection face 70.

The first laser light L1 thus guided to the collimate lens 12 is converted into a collimated light beam, guided to the objective lens 13, and converged into a light spot on the recording face of the DVD as an optical recording medium D, by the objective lens 13. Accordingly, a light of approximately 60% (in amount) of the first laser light L1 emitted from the first light source 4 is guided to the optical recording medium D.

The first laser light L1 as reflected by the optical recording medium D travels back through the objective lens 13, the collimate lens 12 and the mirror 11, and reaches the prism 6.

Assuming that the optical recording medium D has no birefringence property, and the first laser light L1 does not change its polarization plane when it is reflected by the optical recording medium D, and is incident on the prism 6 as an S-polarized light, then a light component of approximately 99% (R1S: reflectivity of the prism 6 for the S-polarized light having a wavelength of 650 nm) of the first laser light L1 is reflected by the partial reflection face 60 of the prism 6, and the optical axis of the reflected laser light is curved by 90 degrees so that it is directed to the half mirror 7. A light component of approximately 39% (T2S: transmittance of the half mirror 7 for the S-polarized light having a wavelength of 650 nm) of the return light of the laser light L1 for a DVD passes through the partial reflection face 70 of the half mirror 7, and is incident on a sensor lens 15. Then it passes through the sensor lens 15 and reaches the light receiving element 9. Accordingly, a light of approximately 39% (in amount) of the first laser light L1 as reflected by the optical recording medium D reaches the light receiving element 9.

On the other hand, assuming that the optical recording medium D has birefringence, and the first laser light L1 changes its polarization plane when it is reflected by the optical recording medium D, and is incident on the prism 6 as a P-polarized light, then a light component of approximately 64% (R1P: reflectivity of the prism 6 for the P-polarized light having a wavelength of 650 nm) of the first laser light L1 is reflected by the partial reflection face 60 of the prism 6, and the reflected light goes to the half mirror 7. A light component of approximately 63% (T2P: transmittance of the half mirror 7 for the P-polarized light having a wavelength of 650 nm) of the return light of the laser light L1 for a DVD transmits through the partial reflection face 70 of the half mirror 7, and is incident on the sensor lens 15, and passes through the sensor lens 15 and reaches the light receiving element 9. Accordingly, a light of approximately 40% (in amount) of the first laser light L1 as reflected by the optical recording medium D reaches the light receiving element 9.

Thus, in the optical head device 1 of the embodiment, a total transmission efficiency of the prism 6 and the half mirror 7 through which the return light of the first laser light L1 of 650 nm in wavelength passes, satisfies the following equation:

$$R1S \cdot T2S = R1P \cdot T2P \approx 40\%$$

The equation teaches that the total transmission efficiency is substantially equal for both the P-polarized light and the S-polarized light. Therefore, a light of approximately 40% (in amount) of the first laser light L1 as is reflected by the optical recording medium D reaches the light receiving element 9 irrespective of whether the optical recording medium D has birefringence, viz., a light amount ratio of the S-polarized light component and the P-polarized light component changes when the first laser light L1 is reflected by the optical recording medium D. Accordingly, even if the optical recording medium D has birefringence, a good reproduction characteristic can be always obtained.

The second laser light L2 emitted from the second light source 5 passes through the grating element 14, and then through the relay lens 8 having a positive power, and is incident on the prism 6. A light component of approximately 90% (T1P: transmittance of the prism 6 for the P-polarized light having a wavelength of 785 nm) of the second laser light L2 that is incident on the prism 6 passes through the partial reflection face 60 to the mirror 11 on the common optical path 10; and it is reflected upward by the mirror 11 and then is incident on the collimate lens 12.

The second laser light L2 thus guided to the collimate lens 12 is converted into a collimated light beam, guided to the objective lens 13, and converged into a light spot on the recording face of the CD as an optical recording medium D, by the objective lens 13. Accordingly, a light component of approximately 90% of the second laser light L2 emitted from the second light source 5 is guided to the optical recording medium D.

The second laser light L2 as reflected by the optical recording medium D also returns to the prism 6 through the objective lens 13, the collimate lens 12 and the mirror 11.

Assuming that the optical recording medium D has no birefringence property, and the second laser light L2 does not change its the polarization plane when it is reflected by the optical recording medium D, a light component of approximately 10% (R1P: reflectivity of the prism 6 for the P-polarized light having a wavelength of 785 nm) of the second laser light L2 is reflected by the partial reflection face 60 of the prism 6, and the optical axis of the reflection laser light is curved by 90 degrees so that it is directed to the half mirror 7. A light component of approximately 8% (T2P: transmittance of the half mirror 7 for the P-polarized light having a wavelength of 785 nm) of the return light of the second light L2 for a CD passes through the partial reflection face 70 of the half mirror 7 so that it is incident on the sensor lens 15, and passes through the sensor lens 15 and reaches the light receiving element 9. As a result, a light component of approximately 8% of the second laser light L2 as reflected by the optical recording medium D reaches the light receiving element 9.

On the other hand, assuming that the optical recording medium D has birefringence, and the first laser light L1 changes its polarization plane when it is reflected by the optical recording medium D, and is incident on the prism 6 as the S-polarized light, then a light component of approximately 22% (R1P: reflectivity of the prism 6 for the S-polarized light having a wavelength of 785 nm) of the second laser light L2 is reflected by the partial reflection face 60 of the prism 6, and the reflected light goes to the half mirror 7. A light component of approximately 36% (T2S: transmittance of the half mirror 7 for the S-polarized light having a wavelength of 785 nm) of the return light of the laser light L2 for a CD passes through the partial reflection face 70 of the half mirror 7, and is incident on the sensor lens 15, and passes through the sensor lens 15 and reaches the light receiving element 9. As a result, a light component of approximately 8% of the second laser light L2 as reflected by the optical recording medium D reaches the light receiving element 9.

In the optical head device 1 of the instant embodiment, a total transmission efficiency of the prism 6 and the half mirror 7 through which the return light of the second laser light L2 of 785 nm in wavelength passes, satisfies the following equation:

$$R1P \cdot T2P = R1S \cdot T2S \cong 8\%$$

The total transmission efficiency for the P-polarized light component is substantially equal to that for the S-polarized light component. Therefore, a light of approximately 8% (in amount) of the second laser light L2 as is reflected by the optical recording medium D reaches the light receiving element 9 irrespective of whether the optical recording medium D has birefringence, viz., a light amount ratio of the S-polarized light component and the P-polarized light component changes when the second laser light L2 is reflected by the optical recording medium D. Therefore, even when the optical recording medium D has birefringence, a good reproduction characteristic can be always obtained.

The sensor lens 15 is a lens for generating an astigmatism for both the laser lights L1 and L2. With the use of the sensor lens, the return lights of the first laser light L1 for DVDs and the second laser light L2 for CDs undergo when those lights pass through the sensor lens 15. Accordingly, as well known, when the quadrant photodetective elements are provided with the sensor lens 15, the focusing correction may be made by using the amounts of photo-current output from those elements.

As described above, although information is recorded on and reproduced from optical recording mediums whose recording modes are different, such as CD, CD-R and DVD, through use of two diodes 4 and 5 for DVD and CD, and CD-R, there is no need of providing optical systems respectively for the diodes 4 and 5 since the common optical path 10 is formed by using the mirror 11, the collimate lens 12 and the objective lens 13. Accordingly, the number of optical elements forming the optical system is remarkably reduced. Further, parts and assembling costs may be reduced, so that an inexpensive optical head device 1 is realized. Additionally, an area occupied by the optical system is reduced by the amount corresponding to the reduced number of necessary optical elements. This makes the optical head device 1 compact. For this reason, the optical head device 1 may be incorporated into a notebook model PC which is able to handle the optical recording mediums of different recording modes, such as CD-R and DVD.

In the instant optical head device 1, the total transmission efficiency of the prism 6 and the half mirror 7 which allow the return light form the optical recording medium D to pass therethrough or reflect it, for the P-polarized light component is substantially equal to that for the S-polarized light component. Therefore, even when the optical recording medium D has birefringence, the optical head device is operable with good reproduction characteristics for both of the DVD and the CD. Further, there is no need of determining a layout of the optical system in connection with birefringence of the optical recording medium D. A design freedom in designing the optical head device is enhanced.

In the case where the plural optical elements (prism 6 and half mirror 7) through which the return light as reflected from the optical recording medium D travels and reaches the light receiving element 9 are all designed to be of the non-polarization type, the prism 6 and the half mirror 7 are very expensive. In this connection, it is noted that in the invention, the optical elements used may have different transmission efficiencies for the S- and P-polarized light components. Accordingly, there is no need of laminating 30 or greater number of dielectric films for forming the partial reflection faces 60 and 70. Therefore, cheap optical elements may be used for the prism 6 and half mirror 7. Since the number of layers is small, characteristic variations on transmittance and reflectivity are stable.

In the optical head device 1 of the instant embodiment, to guide the first laser light L1 emitted from the first light source 4 and the second laser light L2 emitted from the second light source 5 to the common optical path 10, since it is preferable that the magnification of the optical system is larger for the first laser light L1 emitted from the first light source 4. Therefore, the half mirror 7 (return light splitter) is disposed on the optical path ranging from the first light source 4 to the prism 6. On the other hand, since it is preferable that a relay lens 8 having a positive power is disposed between the second light source 5 and the prism 6 for the second laser light L2 emitted from the second light source 5, thereby reducing the magnification of the optical system. The half mirror 7 is not disposed between the second light source 5 and the prism 6. Accordingly, even if the relay lens 8 having a positive power is disposed between the second light source 5 and the prism 6 for the second laser light L2 emitted from the second light source 5, a relatively long distance is secured between the relay lens 8 and second light source 5. Therefore, if the optical characteristics of the relay lens 8 are a little varied, the performances of the optical head device 1 are not degraded. Relatively large tolerances are set up for the accuracy of the relay lens 8 per se and the accuracy of the assembling position of the relay lens 8. Variations of the divergent angle of the second laser light L2 emitted from the relay lens 8 and variations of the magnification, and the axis offset of the relay lens 8 hardly appear in the form of the aberration. Therefore, in the optical head device 1 of the type in which information is recorded into and reproduced from optical recording mediums having different recording modes by correspondingly using two different laser diodes (laser light sources) for emitting laser lights L1 and L2 having different wavelengths, If the magnification of the optical system for the first laser light L1 is made different from that for the second laser light L2 by using the relay lens 8, no problem arises in the layout and aberration.

A sufficient space for disposing the relay lens 8 and the grating element 14 is secured between the second light source 5 and the prism 6. In the related optical head device 101 shown in FIG. 5, the relay lens 8 and the grating element 14 are inevitably disposed in a narrow space between the second light source 5 and the half mirror 7. However, such a layout of the optical elements is spatially difficult. In the optical arrangement shown in FIG. 5, the first laser light L1 of which the magnification of the optical system must be selected to be large, is directly incident on the prism 6, from the first light source 4. As a result, a distance between the first light source 4 and the prism 6 is relatively long, and the base 3 must be large in size. The optical head device 1 of the instant embodiment is free from such problems.

In the embodiment, when the relay lens 8 and the grating element 14 are disposed between the second light source 5 and the prism 6, the grating element 14 is disposed between the second light source 5 and the relay lens 8. Accordingly, a sufficient distance is secured between the relay lens 8 and the second light source 5 when comparing with the case where the grating element 14 is disposed between the prism 6 and the relay lens 8.

Furthermore, a sufficient distance is secured between the second light source 5 and the grating element 14. Accordingly, three beams are stably formed.

In the embodiment, in creating a predetermined difference between the magnification for the first laser light L1 and that for the second laser light L2, the relay lens 8 having a positive power is provided for the second laser light L2 for which decrease of the magnification of the optical system is required, unlike the optical arrangement in which the relay lens having a negative power is provided for the first laser light L1 for which decrease of the magnification of the optical system is required. Accordingly, the converged light is incident on the prism 6. For this reason, in the optical arrangement of the instant optical head device, the angle dependency tolerance is larger than in the optical arrangement where the diverging light is incident on the prism 6. Therefore, extremely high accuracy is not required for the relay lens 8. Further, extremely high assembling accuracy is not required when the optical head device 1 is assembled. Further, since the greatly thick prism 6 may be used, the lens 6 having stable optical characteristics may easily be manufactured.

Additionally, in the instant embodiment, the light directed to the optical recording medium D, rather than the return light, is preferentially handled so that a light component of 90% or higher of the second laser light L2 emitted from the second light source 5 is reflected by the partial reflection face 60 of the prism 6, and is guided to the common optical path 10. Therefore, a light spot having a high power enough to record information on the CD-R may be formed.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical head device for recording/reproducing information on/from an optical recording medium, comprising:
   at least one laser light source, which emits a laser light beam provided with a first polarized light component and a second polarized light component which are perpendicular to each other;
   a light receiving element;
   a plurality of optical elements, which transmit a return light beam reflected by the optical recording medium therethrough to the light receiving element, wherein:
   each one of the plurality of optical elements has a first transmission efficiency for the first polarized light component and a second transmission efficiency for the second polarized light component which is different from the first transmission efficiency; and
   a total transmission efficiency for the first polarized light component through the plurality of optical elements, and a total transmission efficiency for the second polarized light component, through the plurality of optical elements, are made substantially identical.

2. The optical head device as set forth in claim 1, wherein the at least one laser light source includes a first laser light source for emitting a first laser light beam having a first wavelength and a second laser light source for emitting a second laser light beam having a second wavelength which is different from the first wavelength.

3. The optical head device as set forth in claim 2, wherein the first laser light beam is used for recording/reproducing information on/from a digital video disk, and the second light beam is used for recording/reproducing on/from a compact disk.

4. The optical head device as set forth in claim 3, wherein:
   the plurality of optical elements comprises a prism and a half mirror, each having a partial reflection face;
   the first laser light beam reaches the digital video disk while being transmitted by the prism and the half mirror; and
   the second laser light beam reaches the compact disk while being transmitted by the prism.

5. The optical head device as set forth in claim 4, further comprising a relay lens having a positive power, disposed between the second laser light source and the prism.

6. The optical head device as set forth in claim 5, further comprising a grating element disposed between the second laser light source and the relay lens.

7. The optical head device as set forth in claim 1, wherein the plurality of optical elements comprises a prism and a half mirror, each having a partial reflection face.

8. The optical head device as set forth in claim 1, wherein the first polarized light component is an S-polarized light component of the emitted laser beam, and the second polarized light component is a P-polarized light of the emitted laser beam.

9. An optical head device for recording/reproducing information on/from an optical recording medium, comprising:
   at least one laser light source, which emits a laser light beam provided with a first polarized light component and a second polarized light component which are perpendicular to each other;
   a light receiving element;

a plurality of optical elements, which transmit a return light beam reflected by the optical recording medium therethrough to he light receiving element, wherein:

a total transmission efficiency for the first polarized light component and a total transmission efficiency for the second polarized light component, which are defined by the respective transmission efficiencies of all the optical elements, are made substantially identical;

the at least one laser light source includes a first laser light source for emitting a first laser light beam having a first wavelength and a second laser light source for emitting a second laser light beam having a second wavelength which is different from the first wavelength;

the first laser light beam is used for recording/reproducing information on/from a digital video disk, and the second light beam is used for recording/reproducing information on/from a compact disk;

the optical elements include a prism and a half mirror, each having a partial reflection face;

the first laser light beam reaches the digital video disk while being transmitted by the prism and the half mirror; and the second laser light beam reaches the compact disk while being transmitted by the prism.

10. The optical head device as set forth in claim 9, further comprising a relay lens having a positive power, disposed between the second laser light source and the prism.

11. The optical head device as set forth in claim 10, further comprising a grating element disposed between the second laser light source and the relay lens.

12. An optical head device for recording/reproducing information on/from an optical recording medium, comprising:

at least one laser light source, which emits a laser light beam provided with a first polarized light component and a second polarized light component which are perpendicular to each other;

a light receiving element;

a plurality of optical elements, which transmit a return light beam reflected by the optical recording medium therethrough to the light receiving element, the plurality of optical elements comprising:

a first optical element having a first transmission efficiency for the first polarized light component and a second transmission efficiency for the second polarized light component which is different from the first transmission efficiency; and a second optical element having a third transmission efficiency for the first polarized light component and a fourth transmission efficiency for the second polarized light component which is different from the third transmission efficiency, wherein a total transmission efficiency for the first polarized light component and a total transmission efficiency for the second polarized light component, which are defined by the respective transmission efficiencies of all the optical elements, are made substantially identical.

* * * * *